United States Patent [19]

Kurihara et al.

[11] Patent Number: 5,390,161
[45] Date of Patent: Feb. 14, 1995

[54] MICROPROBE, METHOD FOR PRODUCING THE SAME, AND INFORMATION INPUT AND/OR OUTPUT APPARATUS UTILIZING THE SAME

[75] Inventors: Suomi Kurihara, Atsugi; Haruki Kawada; Kiyoshi Takimoto, Kawasaki; Yuji Kasanuki, Tokyo; Toshimitsu Kawase, Atsugi; Hisaaki Kawade; Ken Eguchi, both of Yokohama, all of Japan

[73] Assignee: Canon Kabushiki Kaisha, Tokyo, Japan

[21] Appl. No.: 240,538

[22] Filed: May 10, 1994

Related U.S. Application Data

[63] Continuation of Ser. No. 639,219, Jan. 9, 1991, abandoned.

[30] Foreign Application Priority Data

Jan. 11, 1990 [JP] Japan .................. 2-002500
Mar. 28, 1990 [JP] Japan .................. 2-077063

[51] Int. Cl.⁶ .................................. H01J 37/26
[52] U.S. Cl. .................................. 369/126; 250/306
[58] Field of Search ............... 250/306, 307; 369/126, 369/101; 365/151; 324/158 P

[56] References Cited

U.S. PATENT DOCUMENTS

| 4,575,822 | 3/1986 | Quate | 365/174 |
| 4,880,975 | 11/1989 | Nishioka et al. | 250/306 |
| 4,894,538 | 1/1990 | Iwatsuki et al. | 250/307 X |
| 4,943,720 | 7/1990 | Jones | 250/306 |
| 4,998,016 | 3/1991 | Nose et al. | 250/306 |
| 5,010,249 | 4/1991 | Nishikawa | 250/306 |

FOREIGN PATENT DOCUMENTS

| 0309236 | 3/1989 | European Pat. Off. . |
| 0355241 | 2/1990 | European Pat. Off. . |
| 0413040A1 | 2/1991 | European Pat. Off. . |
| 63-161552 | 7/1988 | Japan . |
| 63-161553 | 7/1988 | Japan . |
| 63-204531 | 8/1988 | Japan . |
| 1-096841 | 7/1989 | Japan . |
| 0245602 | 10/1990 | Japan | 250/306 |

OTHER PUBLICATIONS

"Spin-polarized secondary electrons from a scanning tunneling microscope in field emission mode" by R. Allenspach et al., Applied Physics Letters, 6 Feb., 1989 vol. 54, No. 6 pp. 587–589.

"Mono-atomic tips for scanning tunneling microscopy" by Hans-Werner Fink, IBM Journal of Research and Development vol. 30. No. 5, Sep. 1986.

"Scanning tunneling microscopy" by G. Binnig et al. Helvetica Physica Acta. vol. 55 (1982) pp. 726–735.

"New scanning tunneling microscopy tip for measuring surface topography" by Y. Akama et al. Journal of Vacuum Science & Technology A 8 (1990) Jan/Feb, No. 1 New York pp. 429–433.

"Vapor-Liquid-Solid Mechanism of Single Crystal Growth" by R. S. Wagner et al. Applied Physics Letters, vol. 4, No. 5 1 Mar. 1964 pp. 89–90.

*Primary Examiner*—Jack I. Berman
*Attorney, Agent, or Firm*—Fitzpatrick, Cella Harper & Scinto

[57] ABSTRACT

A probe for reading an information from an object and/or inputting an information to an object is disclosed. The probe has a supporting member and a rod-shaped projection of which the end is positioned opposed to the object for information reading therefrom and/or information input thereto. The rod-shaped projection protrudes from a partial area of the supporting member. The information reading from the object and/or information input to the object is effected at the longitudinal end of the probe. The probe provides precise and accurate output and/or input of information regardless of the surface state of the object.

66 Claims, 6 Drawing Sheets

MINUTE PROBE ELECTRODE

MICROPROBE, METHOD FOR PRODUCING THE SAME, AND INFORMATION INPUT AND/OR OUTPUT APPARATUS UTILIZING THE SAME

This application is a continuation of application Ser. No. 07/639,219, filed Jan. 9, 1991, now abandoned.

BACKGROUND OF THE INVENTION

1. Field of the Invention

The present invention relates to a microprobe adapted for use as a muscle current measuring probe or in observing apparatus and record/reproducing apparatus such as the probe for a scanning tunnel microscope (STM) or for a force microscope (FM), a method for producing such microprobe, and an information output and/or input apparatus utilizing such microprobe.

2. Related Background Art

A microprobe is often employed in the measurements under a situation with minimized influence to the measured system or in the access to a very small area, namely the measurement of such very small area.

For example, in the neural potential measurement or in the muscle current measurement in a living organism, as the object to be measured is as small as one micron to one millimeter at maximum, the radius of curvature at the pointed end of the measuring probe has also to be likewise one micron to one millimeter. Also the scanning tunnel microscope, which is attracting much attention in recent years as a novel observing method of the resolving power of atomic or molecular size, is considered to attain a higher resolving power as the radius of curvature of the pointed end of the probe, opposed to the specimen surface, is smaller. Ideally said pointed end is sharpened to the atomic size, namely the size of an atom.

Conventionally the probe with such a small radius of curvature at the pointed end is produced by mechanical working or electrolytic polishing. In the mechanical working, a probe with a radius of curvature of 5-10 μm at the pointed end can be obtained by working a fiber-shaped crystal with a watch lathe, and a radius of curvature less than 10 μm can be obtained by die drawing. In the electrolytic polishing, a straight wire-shaped material of a diameter not exceeding 1 mm is immersed vertically by 1-2 mm in electrolyte liquid and is given a voltage intermittently with an interval of 0.2-2.0 seconds under suitable agitation of the electrolyte liquid. This method can provide a probe with the radius of curvature of the order of 0.05 μm at the pointed end.

More recently, the field evaporation method (H. W. Fink, IBM Journal of Research and Development 30, 460, (1986)) is utilized for producing a probe with one to several atoms at the pointed end, with theoretically smallest radius of curvature (R. Allenspach and A. Bischof, Applied Physics Letters 54, 587 (1989)).

Figure 1:
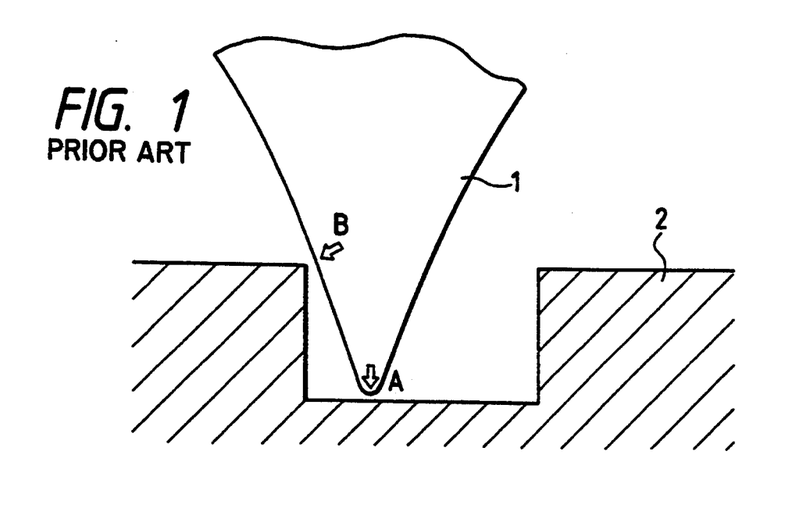
FIGS. 1 and 3 are schematic views of conventional microprobes.
Figure 2:
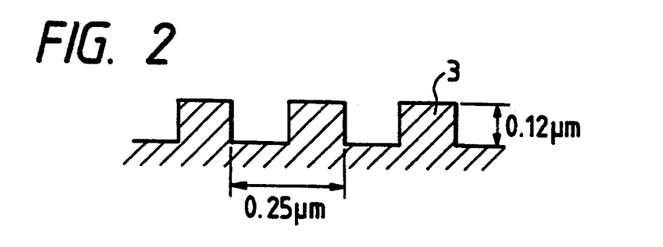
FIG. 2 is a cross-sectional view of a semiconductor laser grating employed for evaluating a microprobe.

The probe with a quite small radius of curvature at the pointed end, produced by the above-mentioned methods, can provide information with an extremely high resolving power when used in observing a specimen of relative smooth surface. However, if the specimen surface has relatively large irregularities as shown in FIG. 1, the probe 1' and the surface of the specimen 2' may be very close or in mutual contact in a position other than the pointed end (longitudinally most extended part) A of the probe, as indicated by an arrow B, whereby the probe may simultaneously pick up information at two or more locations. As the result, the resolving power cannot be reduced to a value matching the radius of curvature at the pointed end of the probe, or the information on a recessed part becomes inaccurate. For example, when the surface of a semiconductor laser grating of a surface structure as shown in FIG. 2 is observed with a scanning tunnel microscope, even a probe with a very small radius of curvature at the pointed end cannot accurately reproduce the surface irregularities of the specimen because of the above-explained reason, and the actual surface irregularities with sharp ridges can only be observed as smoothly modulating irregularities.

In recent years, various memory devices have been very actively developed, as the nucleus of electronic equipment such as computers, computer-related equipment, video disks, digital audio disks etc.

Though dependent on applications, the general requirements for such memory devices can be summarized as:

1) high density and large recording capacity;
2) high response speed in recording and reproduction;
3) low electric power consumption; and
4) high productivity and low cost.

Conventionally the memory devices have been dominated by semiconductor memories and magnetic memories, but, with the advent of laser technology in recent years, there has been introduced the inexpensive high-density optical memories utilizing an organic thin film for example of organic dyes or photopolymers.

On the other hand, the recent development of the scanning tunnel microscope capable of directly observing the electron structure of surfacial atoms of conductive materials [G. Binnig et al., Helvetica Physica Acta, 55, 726 (1982)] enables measurement of the real space image with a high resolving power both in the monocrystalline and in the amorphous materials. Extensive applications are expected for said microscope because it can achieve observation with a low electric power, without damage by current to the observed specimen, and can be used for various materials even in the air.

The scanning tunnel microscope is based on the phenomenon of tunnel current generated when a metal probe electrode and a conductive material are maintained at a very small distance, in the order of 1 nm, with a voltage applied therebetween. Said current is very sensitive to the change in said distance. It is therefore possible to observe the surface structure in real space and to obtain various information on the total electron cloud of surfacial atoms from the amount of vertical movement of the probe, by controlling said distance, with vertical movement of the probe electrode, so as to maintain a constant tunnel current. Also there have been proposed various methods of information recording and reproduction utilizing such scanning tunnel microscope, such as forming a record by modifying the surface state of a recording layer of a suitable recording medium with a particle beam (electron beam or ion beam), a high-energy electromagnetic wave such as X-ray or an energy beam such as visible or ultraviolet light and reading such record with the scanning tunnel microscope, or effecting the recording and the reproduction by the scanning tunnel microscope utilizing a recording layer with a memory effect in the voltage-current switching characteristic, such as a thin film of an organic compound with a π-electron system or a charcogenide compound (as disclosed for example in the Japanese Laid-open Patent Applications 63-161552, 63-161553 and 63-204531).

Figure 3:
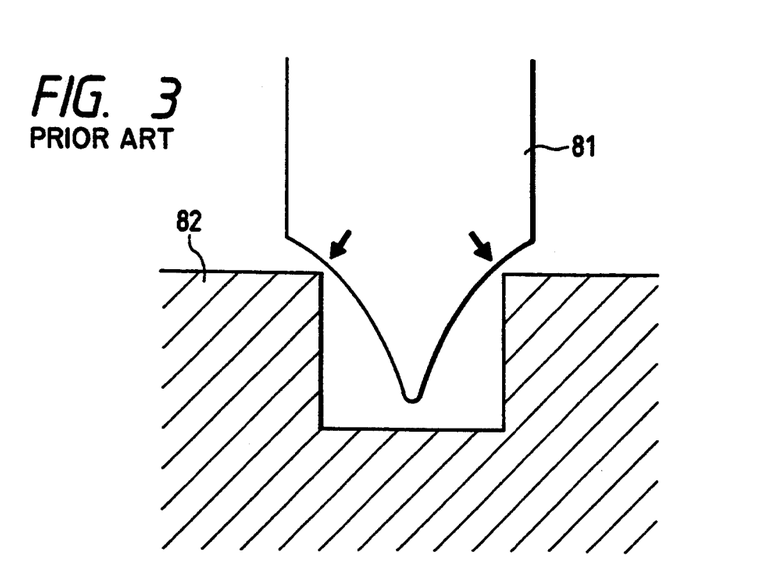

FIG. 3 shows an example of the probe electrode to be employed in such record/reproducing methods.

FIG. 3 shows a state in which a probe electrode 81 is positioned close to a recording medium 82 with surface irregularities. The resolving power of such probe electrode 81 is generally higher as the radius of curvature at the pointed end becomes smaller.

The probe electrode of small radius of curvature at the pointed end, employed for the above-mentioned purposes, is conventionally produced by mechanical working or electrolytic polishing, like the probes for the aforementioned observing apparatus.

Also the aforementioned field evaporation method is recently utilized for producing a probe electrode with one to several atoms at the pointed end, corresponding to the theoretically smallest radius of curvature.

The probe electrode with such small radius of curvature enables recording and reproduction in the atomic order, namely several Angstroms.

Figure 12:
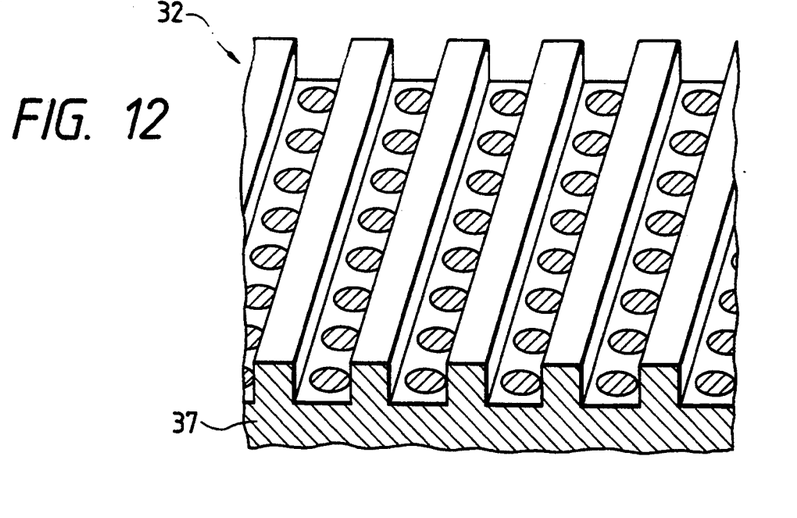
FIG. 12 is a perspective view showing an example of the shape of the recording medium.

The probe electrode with a very small radius of curvature at the pointed end, obtained by the above-mentioned conventional methods, can exactly record the information with an extremely high density, if the recording medium has a completely flat surface. In practice, however, such flat recording medium is difficult to obtain, and the surface of the medium often shows significant irregularities. On such medium, the conventional probe electrode 81 may contact or may be positioned very close to the surface of the recording medium 82 in a position other than the longitudinal end of the probe electrode, as indicated by an arrow in FIG. 3, whereby the probe electrode 81 will record the information in an erroneous position of the recording medium 82. Consequently, the information recording with such probe electrode with result in drawbacks that the recorded information cannot be reproduced or that a recording density matching the radius curvature of the pointed end of the probe cannot be obtained. Thus the recording yield has been very poor as the surface of the recording medium has been utilized only in a very limited smooth area. Also in case of a recording medium with tracking grooves as shown in FIG. 12, with the reduction in pitch of the grooves for elevating the recording density, the record bits become more difficult to form in recesses portions which are more resistant to destruction for example by abrasion, and have to be formed on the protruding portions which are more apt to be destructed by abrasion.

SUMMARY OF THE INVENTION

In consideration of the foregoing, an object of the present invention is to provide a probe capable of precise and accurate output and/or input of information regardless of the surface state of the object, a method for producing such probe, and an information output and/or input apparatus utilizing such probe.

Other objects of the present invention will become fully apparent from the following detailed description of the embodiments of the present invention.

DETAILED DESCRIPTION OF THE PREFERRED EMBODIMENTS

[Brief Explanation of Probe]

Figure 4:
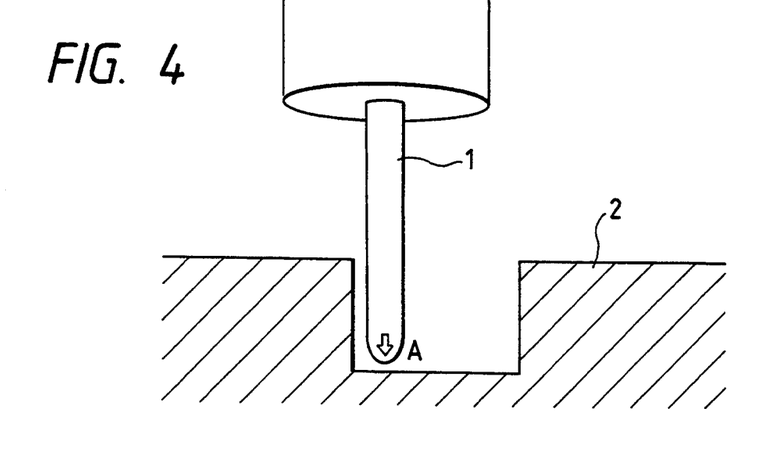
FIG. 4 is a schematic view of a microprobe of the present invention.

In the following embodiments, the cross sectional shape of the probe at any distance from the pointed end of the probe not exceeding the height of surface irregularities of the specimen is made identical with the cross sectional shape at the pointed end of the probe. However, even when the cross sectional shape of the probe are not completely identical, the probability of mutual contact or mutual close positioning of the probe and the specimen surface diminishes if said cross sectional shapes are close to the mutually identical state. Such condition is attained by a cylinder, a polygonal pillar or a similar shape, namely a rod-shaped projection. As the radius of curvature at the end of the probe does not exceed the radius of cross section of the probe or a half of the maximum cross dimension of said cross section, so that a reduction in the cross section of the area automatically reduces the radius of curvature, thus providing a sufficient resolving power. Consequently the maximum diameter or maximum cross dimension of the probe in the pointed end thereof and in a portion thereof of which length does not exceed the height of surface irregularities of the specimen is desirably from 1 nm to 2 mm, more desirably from 1 nm to 1 $\mu$m, and most desirably from 1 to 10 nm. Also the variation rate of the area of the cross section perpendicular to the probe axis is desirably within 10% anywhere over a distance of 5 nm along the axis. FIG. 4 schematically shows such probe of the present invention, whereas FIG. 1 schematically shows a conventional probe. In FIGS. 4 and 1, arrows A and B indicate the flowing position of the tunnel current. Comparison of FIGS. 4 and 1 clarifies that the probe of the present invention shown in FIG. 4, unlike the conventional probe shown in FIG. 1, does not generate the tunnel current in two or more positions on the probe surface.

Such form can be more advantageously realized by utilization of growth of an acicular crystal, so-called whisker, rather than the conventional method of mechanical forming from a large solid material with great care, because of the following reasons:

(1) Whisker is an extremely thin needle-shaped crystal with uniform thickness;
(2) Diameter of the whisker can be made as small as 5–20 nm under suitable crystallizing conditions, so that the radius of curvature at the pointed end of the probe can be made a half or less of said diameter;
(3) The whisker can be made of various metals and insulating materials, including metals frequently used for the electrode, such as Au, Pt and W;
(4) The whisker, being single crystal with much fewer lattice defects than in ordinary single crystals, has an extremely high mechanical strength despite of its prolonged shape;
(5) There is not required particular means apt to contaminate the probe surface, such as polishing.

Whiskers with such features can be prepared by various methods, depending on the material thereof ("Crystal Engineering Handbook", by Crystal Engineering Handbook Editing Committee, Kyoritsu Press).

Following embodiments utilize such acicular crystals, called whiskers, as the probes for attaining the aforementioned objects.

Since the whisker is very thin and small, it has to be combined with a supporting member for its practical use as a probe.

For this purpose, it is conceivable to prepare the whisker and the supporting member separately and to later combine the two for example with an adhesive. However, as a whisker of a diameter equal to or less than 1 $\mu$m can no longer be seen under an optical microscope, the combining operation of the whisker and the supporting member has to be conducted under observation with a microscope of a high magnification, such as a scanning electron microscope.

It is generally easier, than the above-mentioned method, to grow the whisker crystal on the surface of the supporting member itself. However, if the whiskers are grown unlimitedly on the surface of the supporting member, it becomes necessary to eliminate the unnecessary whiskers afterwards. Although such eliminating operation is generally easier than the combining operation of the whisker and the supporting member, it is more preferable to grow a very limited number of whiskers only in a desired position on the surface of the supporting member, in comparison with unlimited growth of whiskers on said surface, in consideration of the ensuing operations. The whisker growing area can be limited mainly by one of following two methods:

1) to realize the whisker growing conditions only in the desired whisker growing area; and
2) to cover the surface with a suitable material, only leaving the desired whisker growing area.

The diameter of the grown whisker may not be equal to the desired value. However, if said diameter is larger than the desired value, it can be reduced to the desired value, utilizing the feature that the whisker is a single crystal, by placing the whisker in a condition where the lateral crystal face melts or evaporates faster than the crystal face at the end.

Also the end of whisker is not necessarily smooth, but, in such case, there may be employed a smoothing method such as immersing the end portion of the whisker in an electrolyte solution for a very short period or heating said end portion.

Although the material for the whisker has not been particularly explained in the foregoing, even a whisker of a non-conductive material may be used as the probe, by coating with a conductive material. The coating can be achieved for example by plating or evaporation, but a coating by sputtering of Au—Pd or Pt is preferable in consideration of the granularity of the coating material.

[Embodiment 1]

Figure 5:
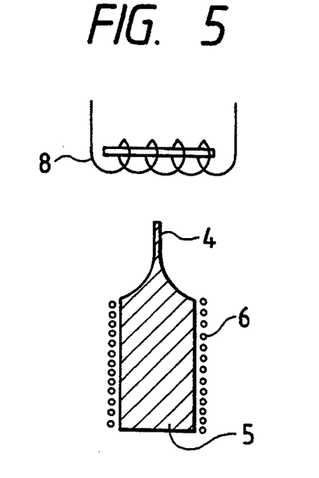
FIG. 5 is a view showing a first embodiment of the microprobe of the present invention, and the method for producing said microprobe.

FIG. 5 shows a microprobe constituting a first embodiment of the present invention, and the producing method therefor, which will be explained in the following.

Figure 8:
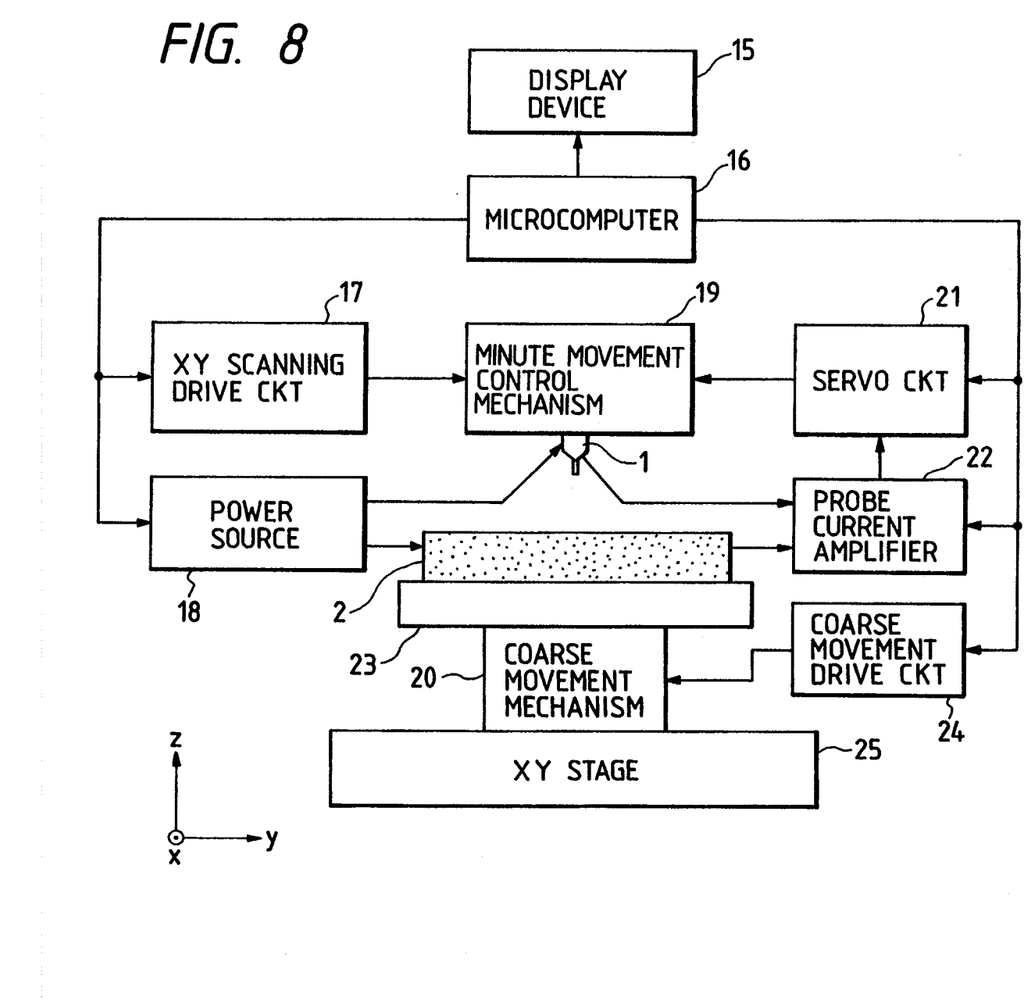
FIG. 8 is a schematic view of a scanning tunnel microscope incorporating the microprobe obtained in the foregoing embodiments.

At first, as a supporting member, a tungsten wire of 1 mm$\phi$ was formed with a projecting part, as shown in FIG. 5, by electrolytic polishing. Said supporting member 5 was placed in high vacuum (about $10^{-9}$ mmHg) and heated with a heater 6 with temperatures of about 800° C. in the vicinity of the heater 6 and about 600° C. in the vicinity of the end of the supporting member. Then a tungsten filament positioned above the supporting member 5 was heated to about 1,000° C. to evaporate copper, positioned in contact with said filament, for about 10 minutes, whereby whiskers were grown in an area close to the end of the supporting member, which was lower in temperature than other parts. Whisker growth was conducted on several supporting members under same conditions, and a supporting member having only one whisker 4 grown upwards as shown in FIG. 5 was selected as the probe. Said whisker was about 5 nm in thickness and about 10 $\mu$m in length. Said probe was adhered or mounted, in a scanning tunnel microscope of which diagram is shown in FIG. 8, on a vernier control mechanism 19 (composed of a piezoelectric material PZT), and used in the observation with said microscope, and the probe performance was evaluated by the comparison of the obtained atomic images. The scanning tunnel microscope was made by the present inventors, and a grating 3' as shown in FIG. 2 was used as the specimen to be measured.

In said scanning tunnel microscope, the specimen 2 is placed and fixed on a table 23. A coarse movement mechanism 20 is provided for coarse control of the vertical position of the specimen 2, in order to maintain a predetermined distance between the specimen 2 and the probe 1, and is controlled by a coarse movement drive circuit 24. Under said coarse movement mechanism, there is provided an X—Y stage 25 for moving the specimen in X- and Y-directions. A power source 18 serves to apply a voltage between the probe electrode 1 and the specimen 2.

A vernier control mechanism 19 serves to move the probe 1 in X-, Y- and Z-directions. A probe current amplifier 22 amplifiers the current of the probe 1 for supply to a servo circuit 21, which controls the movement of the vernier movement mechanism 19 in the vertical direction Z, in such a manner that the current from the probe current amplifier 22 is maintained at a desired value. The movement of the vernier control mechanism 19 in the X- and Y-directions is controlled by an X-Y scanning drive circuit 17. The above-mentioned circuits are collectively controlled by a microcomputer 16, of which process information is displayed on a display unit 15.

The above-explained apparatus was utilized for the observation of the surface of the specimen 2 with the movement of the X-Y stage 25, while maintaining a constant distance of the order of a nanometer between the probe 1 and the specimen 2 by the vernier control mechanism 19 and applying a voltage to the specimen 2. The surface shape was detected by the amount of movement of the vernier control mechanism 19 in the Z-direction by the servo circuit 21, as already described by G. Binnig et al. in the aforementioned reference. As the result, the width of the groove of the grating was detected smaller, by about 5 nm, than the actual width, but the sharp cross-sectional shape and the arrangement of atoms in the recessed part could be well observed. Even if the end of the whisker is broken by an accidental collision of the probe with the specimen surface in the course of scanning motion, the above-explained whisker growing operation may be applied to thus broken whisker. Thus the whisker can be regenerated from the remaining portion of the whisker and can be used again as the probe.

[Embodiment 2]

Figure 6:
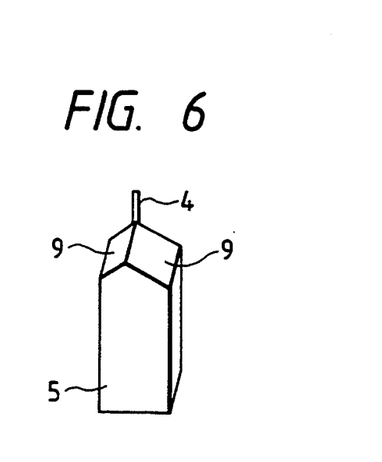
FIG. 6 is an external view of a second embodiment of the microprobe of the present invention.

FIG. 6 shows a microprobe constituting a second embodiment of the present invention. The supporting member 5 is a silver single crystal, of which upper face 9 is composed of two (111) crystal planes and two (100) crystal planes. Said supporting member 5 was subjected to the whisker growing operation same as that shown in FIG. 5, except that the evaporated material was silver and that the filament 8 was heated to about 800° C. This operation resulted in epitaxial growth of a silver whisker 4 having a (110) growing direction from the pointed end surrounded by said two (111) planes and two (100) planes. The grown whisker was about 10 nm in thickness and 15 μm in length. Said whisker was employed as the probe of the scanning tunnel microscope as in the first embodiment and was used in the observation of the specimen 3 as shown in FIG. 2. As the result, the width of the groove was detected smaller, by about 10 nm, than the actual value, but the sharp cross-sectional shape and the arrangement of atoms in the recessed part could be observed. Also in this probe, the regeneration of the whisker could be successfully conducted as in the first embodiment.

[Embodiment 3]

Figure 7A:
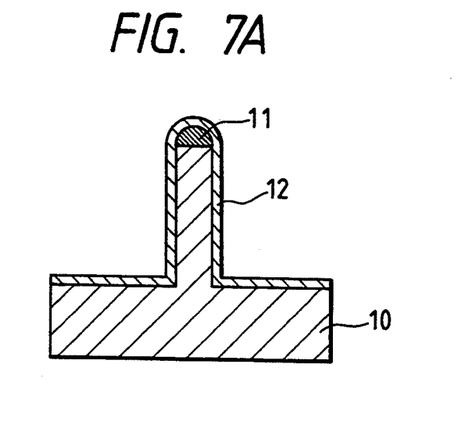
FIGS. 7A and 7B are views showing a third embodiment of the microprobe of the present invention and the method for producing said microprobe.
Figure 7B:
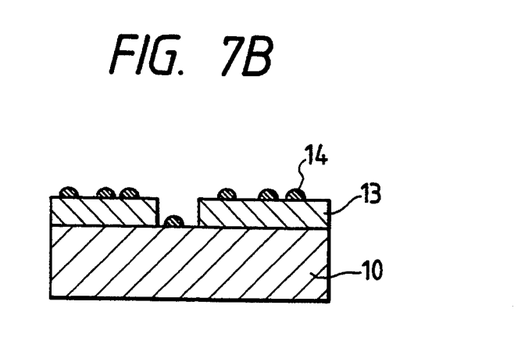

FIGS. 7A and 7B illustrate a microprobe constituting a third embodiment of the present invention, and the producing method therefor. This embodiment utilizes a whisker growing method called VLS method (R. S. Wagner and W. C. Ellis; Applied Physics Letters 4 (1986), 89). The principle of the VLS method is to make a liquid droplet of fused Au—Si alloy on a Si substrate and to place them in SiCl$_4$ atmosphere, whereby Si in gaseous phase is dissolved in the Au—Si liquid droplet to create a supersaturated state and Si is crystallized under said liquid droplet, thus causing whisker growth lifting the liquid droplet. The preparation of the probe utilizing the VLS method was conducted in the following manner. A monocrystalline silicon substrate 10 was used as the supporting member and was coated, on the (111) plane thereof, with photoresist 13. Then holes of about 1 μm φ were formed, with a pitch of 5 mm, in said photoresist 13 by means o an electron beam and a very small amount of Au particles 14 was deposited by evaporation from about (FIG. 7B). Subsequently the resist 13 was stripped off from the Si substrate 10. The amount of Au evaporation was 0.2 nm when measured with a film thickness gauge utilizing a quartz crystal oscillator. However the evaporated Au did not form a uniform film of such thickness, but in fact formed particles of an average diameter of 20 nm, and each hole contained one to several particles. Then the Si substrate was cut into squares of 5×5 mm each, and a Si substrate 10 containing only one Au particle of about 10 nm in diameter was selected by the observation under a scanning electron microscope of a high resolving power. Said substrate 10 was heated to 1000° C. in an oven to cause a reaction between the Au particle 14 and the Si substrate 10 and to form a liquid droplet of Au—Si alloy, and SiCl$_4$—H$_2$ gaseous mixture was fed at about 400° C. Thus, after 3 days, there was grown a whisker of an average thickness of about 10 nm, having Au—Si alloy 11 at the end. Finally the surface of the Si substrate having said grown whisker was given electroconductivity by forming an Au—Pd film 12 of a thickness of 5 nm by sputtering. Said whisker was employed as the probe of the scanning tunnel microscope as in the first embodiment and used in the observation of the specimen 3 as shown in FIG. 2. As the result, the width of the groove was detected smaller, by about 20 nm, than the actual value, but the sharp cross-sectional shape and the arrangement of atoms in the recessed portion could be observed. Particularly the information obtained on the atomic arrangement in the recessed portion was quite comparable in clarity to the information on the atomic arrangement in the protruding portion obtained in the Reference Example 1 to be explained later, since the end of the probe of the present embodiment was composed of Au—Si alloy 11 which maintained, by rapid cooling, the smoothness of the liquid droplet.

[Reference Example 1]

A tungsten wire of 1 mm φ was formed as the supporting member 5 in FIG. 5 by electrolytic polishing and was used as the probe of the scanning tunnel microscope. Under observation with a scanning electron microscope, said probe had a radius of curvature of 5 nm at the end. In the observation of a specimen 3 as shown in FIG. 2, said probe provided clear information on the atomic arrangement in the protruding portion, but the groove could only be observed as a smooth recess with a depth of about 100 nm, and information was scarcely obtained on the atomic arrangement in the recessed portion.

As explained in the foregoing, the microprobes of the first to third embodiments, being extremely thin and long, can provide information on the recessed portion of the specimen or information faithful to the actual shape of the specimen, even in a specimen with significant surface irregularities.

[Record/reproducing Apparatus]

In the following there will be described a record/reproducing apparatus utilizing a microprobe electrode enabling exact recording and reproduction of information even with a recording medium having surface irregularities.

Said record/reproducing apparatus utilizing microprobe electrode is provided with a microprobe electrode; voltage applying means for applying a voltage through said microprobe electrode to a recording medium showing an electric memory effect; and reading means for reading the change in current flowing in said recording medium, for effecting information recording and reproduction on said recording medium by scanning said recording medium with said microprobe electrode while maintaining a predetermined distance between the end of said microprobe electrode and said recording medium;

wherein said microprobe electrode has a probe shaft portion showing a variation rate of the cross sectional area thereof equal to or less than 10% continuously over a length of 5 nm along the axial direction of said microprobe electrode, and said end is formed at the end portion of said probe shaft portion.

Said probe shaft portion of the microprobe electrode, showing the variation rate of the cross sectional area not exceeding 10% continuously over a length of 5 nm along the axial direction of said microprobe electrode, may be formed as a cylinder or a polygonal pillar.

The diameter or maximum cross dimension of said probe shaft portion is preferably in a range from 1 nm to 1 μm.

Also said microprobe electrode may be composed of a single crystal, or formed by crystal growth on a supporting member, or formed by crystal growth by forming a temperature gradient in the supporting member, or by crystal growth in an aperture of a resist layer covering the supporting member.

Figure 10:
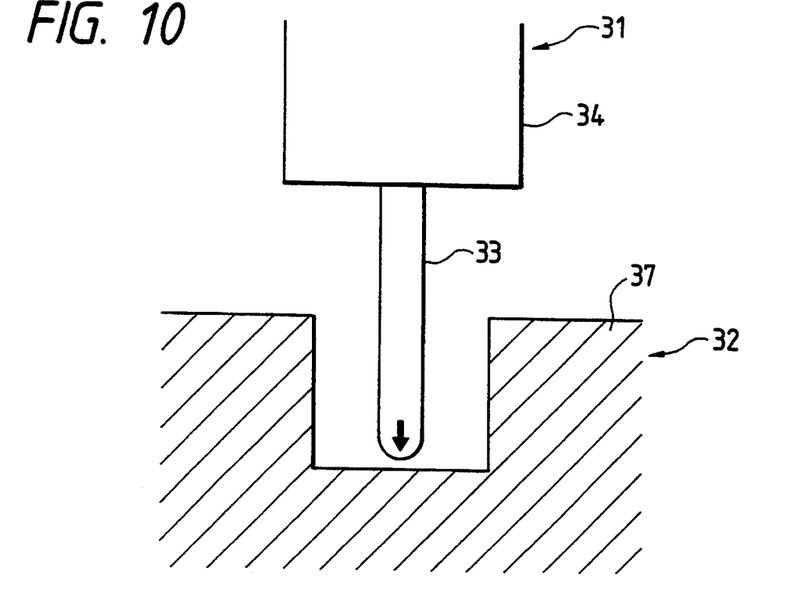
FIG. 10 is a cross-sectional view of the probe employed in the record/reproducing apparatus of the present invention.

In order to avoid eventual contact or very close positioning of said microprobe electrode, except the end thereof, to the recording medium having surface irregularities, the cross-sectional shape of the microprobe electrode 33 is maintained identical, as shown in FIG. 10, in the end portion within the height of surface irregularities of the recording medium 32. However, even when the cross sectional shape of the microprobe electrode is not maintained completely identical, the probability of mutual contact or mutual close positioning of the probe and the recording medium, except the end of said microprobe electrode, diminishes if said cross sectional shape is maintained almost identical. Such condition is attained by a cylinder, a polygonal pillar or a similar shape, namely a rod-shaped projection. As the radius of curvature at the end of the microprobe electrode 33 does not exceed the radius or cross section of the end portion of the microprobe electrode 33 or a half of the maximum cross dimension of said cross section, so that a reduction in the cross section of the area automatically reduces the radius of curvature, thus providing a sufficient resolving power. Consequently, the diameter or maximum cross dimension of the microprobe electrode 33 at the end thereof and in the end portion thereof to be positioned within the height of the surface irregularities of the recording medium 32 at the recording or reproduction is desirably from 1 nm to 1 μm, and more desirably 1 to 10 nm, though it is dependent on the level of surface irregularities of the recording medium 32.

Such microprobe electrode of the above-mentioned form may be realized by crystal growth on a supporting member. In such case, the growth of a very limited number of crystals only in a desired position of the supporting member is preferable to unlimited crystal growth on the supporting member, in consideration of the subsequent operations. The limitation in the area of crystal growth may be principally achieved in one of following two methods:

1) forming a temperature gradient in the supporting member for the microprobe electrode in such a manner that the crystal growing conditions are realized only in a predetermined area; and
2) covering the surface with a suitable resist material, excluding the desired crystal growing area.

In the following there will be explained certain embodiments of the present invention, with reference to the attached drawings.

[Embodiment 4]

Figure 9:
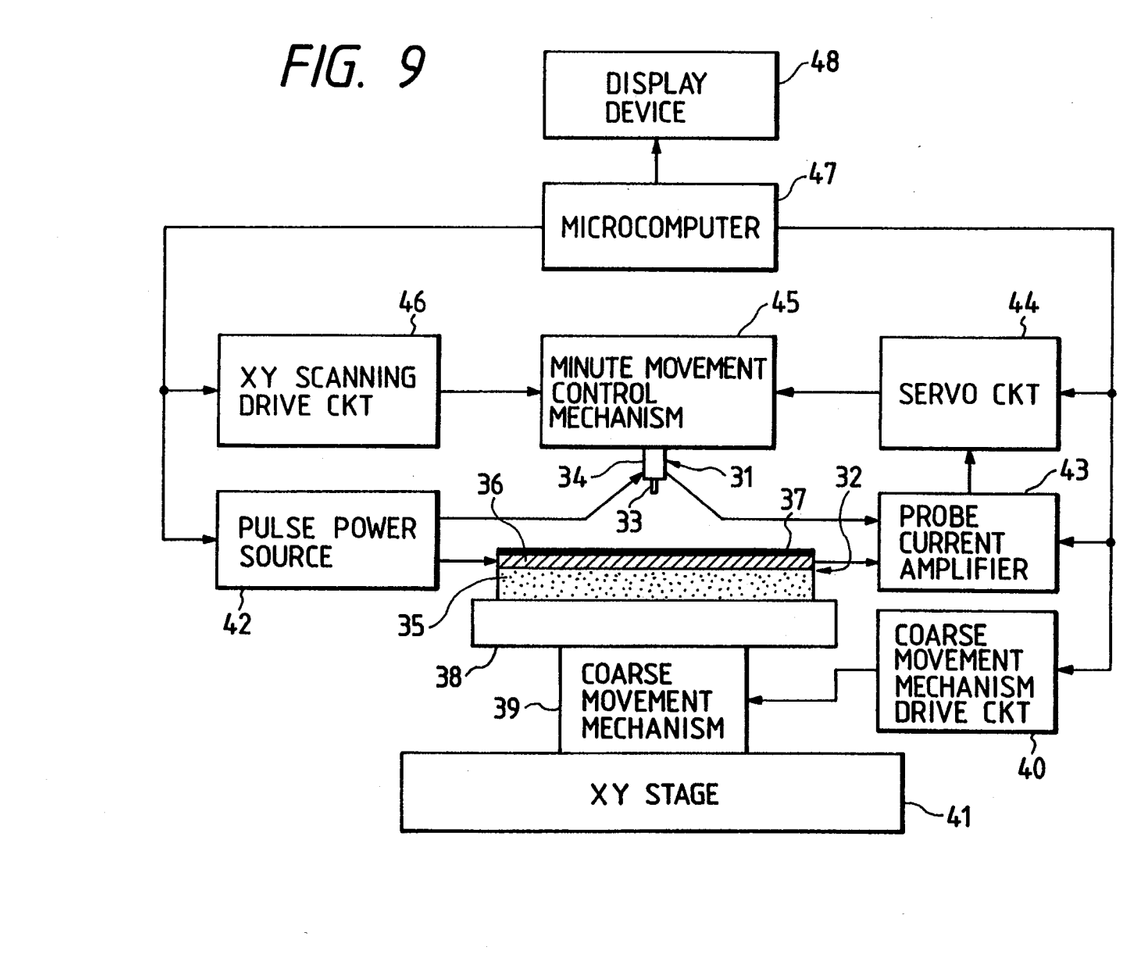
FIG. 9 is a block diagram of an embodiment of the record/reproducing apparatus of the present invention.

FIG. 9 is a block diagram of an embodiment of the record/reproducing apparatus employing the microprobe electrode of the present invention.

Said record/reproducing apparatus effects information recording on a recording medium 32 by applying a writing voltage across a recording layer 37 which is initially in a high-resistance "off" state thereby selectively forming a low-resistance "on" area, and information reproduction by applying a voltage smaller than a switching threshold voltage and detecting the tunnel current from a probe 31.

In said apparatus, the recording medium 32 is composed of a substrate 35, a substrate electrode 36 and a recording layer 37, and is placed and fixed on a table 38. A coarse movement mechanism 39 is provided for coarse control of the vertical position of the recording medium 32, in order to maintain a predetermined distance to a microprobe electrode 33 fixed on a supporting member 34 of the probe 31, and is controlled by a coarse movement drive circuit 40. Under said coarse movement drive mechanism 39, there is provided an X–Y stage 41 for moving the recording medium in X- and Y-directions. A pulse power source 42 serves to apply voltages or recording or erasing (by recording of "0" information) between the microprobe electrode 33 and the substrate electrode 36. A probe current amplifier 43 amplifies the probe current between the microprobe electrode 33 and the recording medium 32 under the application of a predetermined voltage, for supplying to a servo circuit 44, which controls the movement of a vernier control mechanism 45 in the vertical direction, in such a manner that the current from the probe current amplifier 43 is maintained at a desired level. Means for applying said predetermined voltage is omitted in the drawing. The movement of the vernier control mechanism 45 in the X- and Y-directions is controlled by an X–Y scanning drive circuit 46. The above-mentioned circuits are collectively controlled by a microcomputer 47, of which process information is displayed on a display unit 48.

In the following there will be explained the probe 31 employed in the present record/reproducing apparatus.

Figure 11:
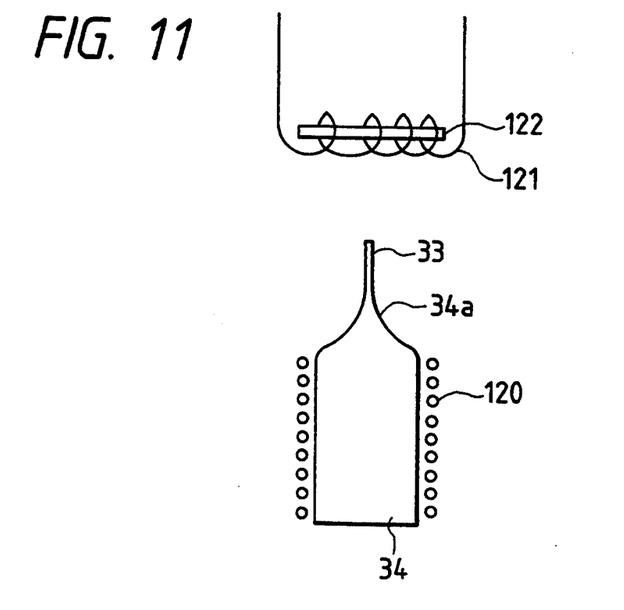
FIG. 11 is a view showing the method for producing the probe shown in FIG. 10.

In the probe 31, as shown in FIG. 10, the microprobe electrode 33 was formed by growing a whisker, which an acicular single crystal, on the supporting member 34, and its producing method will be explained in the following with reference to FIG. 11.

At first a tungsten wire of 1 mm φ was formed as a supporting member 34 with a projection 34a by electrolytic polishing, and said supporting member 34 with said projection 34a was inserted into a coil-shaped heater 120. Copper, as the whisker forming material 122, is positioned inside and in contact with a tungsten filament 121 positioned above said projection 34a of the supporting member 34.

The supporting member 34 and the whisker forming material 122 were placed in high vacuum (about $10^{-9}$ mmHg) and the supporting member 34 was heated by the heater 120.

The temperature of the supporting member 34 was about 800° C. in the vicinity of the heater 120 while about 600° C. in the vicinity of the projection 34a, so that a temperature gradient was generated in the supporting member 34.

Subsequently the tungsten filament 121 positioned above the supporting member 34 was heated to about 1,000° C. to evaporate copper, which was the whisker forming material 122 positioned in contact with said tungsten filament 121, for about 10 minutes, whereby whiskers 33 were grown in the vicinity of the end of the projection 34a which was lower in temperature than in other areas. The whisker growth was conducted on several supporting members under same conditions, and a supporting member 34 having only one whisker grown upwards similar to the microprobe electrode 33 shown in FIG. 11 was selected as the probe 31. Said whisker was about 5 nm in thickness and 10 μm in length, and was formed as a cylinder or a polygonal pillar.

In the present embodiment the microprobe electrode 33 was made of a whisker which an acicular single crystal, in order to enable information recording even in the recessed portion of a recording medium having surface irregularities, and said whisker has following features:

(a) whisker is a needle-shaped single crystal which is extremely thin and uniform in thickness;

(b) diameter of the whisker can be made as small as 5–20 nm under suitable crystallizing conditions, so that the radius of curvature at the end can be made equal to a half of the above-mentioned figure;

(c) whisker can be developed from various metals and insulating materials, including metals frequently utilizes as the electrode, such as Au, Pt or W;

(d) whisker, being single crystal with much fewer lattice defects than in ordinary single crystals, has an extremely high mechanical strength despite of an oblong form; and (e) there is not required any particular means apt to contaminate the probe surface, such as polishing.

In order to evaluate the performance of the above-explained record/reproducing apparatus, there were employed recording medium 32 with a groove structure in the recording layer 37 as shown in FIG. 12 with following dimensions;

(1) width of recess=10 nm; depth of recess=10 nm; width of protrusion=10 nm;

(2) width of recess=20 nm; depth of recess=10 nm; width of protrusion=10 nm;

(3) width of recess=50 nm; depth of recess=20 nm; width of protrusion=20 nm;

(4) width of recess=100 nm; depth of recess=30 nm; width of protrusion=50 nm.

On each of the four recording media mentioned above, recording was conducted by moving the microprobe electrode 33 of the probe 31 along the recessed portion by means of the X-Y stage 41 and the vernier control mechanism 45 and instantaneously applying a recording pulse voltage to the recording layer 37 while maintaining a constant distance (in the order of a nanometer) between said layer 37 and the end of the microprobe electrode 33 by means of the servo circuit 44 and the vernier control mechanism 15. Subsequently, the thus obtained record was re-scanned with the microprobe electrode 33, and the control signal of the servo circuit 44 was obtained as the reproduced information signal. In this manner it was evaluated whether the information could be correctly reproduced. Such method of information recording and reproduction is already well known, for example as described in the Japanese Laid-Open Patent Publication No. 63-161552.

The obtained results indicate that the record/reproducing apparatus employing the microprobe electrode 33 as explained above is capable, in any of the four recording media mentioned above, of correctly recording information in the recess portion and of reproducing the information recorded in the recessed portion.

The whisker of the microprobe electrode 33 employed in this fourth embodiment was broken at the end portion by an accidental collision with the specimen, but the whisker was regenerated from the remaining part thereof by the application of the aforementioned whisker growing operation to the supporting member 34 and could be used again as the microprobe electrode.

The diameter of the grown whisker may not be equal to the desired value. However, if said diameter is larger than the desired value, it can be reduced to the desired value, utilizing the feature that the whisker is a single crystal, by placing the whisker in a condition where the lateral crystal face melts or evaporates faster than the crystal face at the end.

Also the end of the whisker is not necessarily smooth, but, in such case, there may be employed a smoothing method such as immersing the end portion of the whisker in an electrolyte solution for a very short period or heating said end portion.

The use of a whisker, which is an acicular single crystal, allows to obtain an extremely thin microprobe electrode with uniform thickness, thereby enabling correct recording and reproduction even on a recording medium with surface irregularities and thus improving the reliability of the record/reproducing apparatus. Besides the whisker can extent the service life of the microprobe electrode because of its high mechanism strength, and is economical because it can be regenerated even if it is accidentally damaged. Furthermore the manufacture of the microprobe electrode is made easier as the whisker can be grown only in a desired area of the supporting member.

[Embodiment 5]

Figure 13:
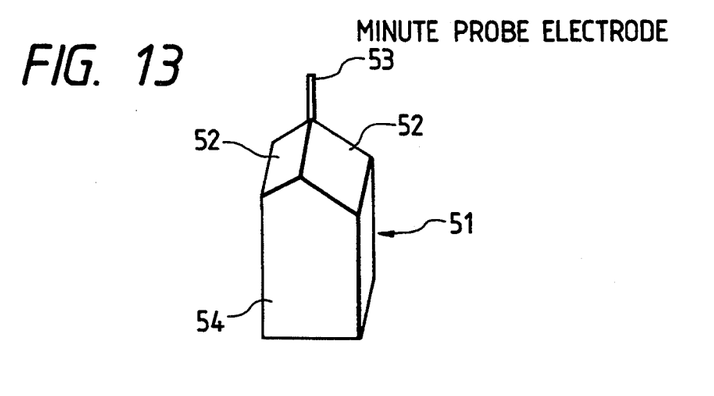
FIG. 13 is a perspective view showing another embodiment of the probe to be employed in the record/reproducing apparatus of the present invention.

In the following there will be explained a fifth embodiment of the present invention, with reference to FIG. 13.

The supporting member 54 of the probe 51 employed in this embodiment is composed of a silver single crystal, of which upper face 52 is composed of two (111) planes and two (100) planes.

Said supporting member 54 was subjected to a whisker growing operation as in the fourth embodiment, except that the evaporated whisker forming material 122 was silver and that the tungsten filament 121 was heated to about 800° C. As the result, at the pointed end, surrounded by said two (111) planes and two (100) planes, of the supporting member 54, there was epitaxially grown a silver whisker of a growing orientation (110), with a thickness of about 10 nm and a length of 15 μm.

The probe 51 with thus grown whisker was employed as the probe 31 of the record/reproducing apparatus shown in FIG. 4, and the information recording and reproduction were conducted, as in the fourth embodiment, on four recording media (1)–(4) with different shapes of the grooves.

The probe 51 of the present embodiment was capable of exactly recording the information in the recessed portion and reproducing the recorded information therefrom in the recording media (2), (3) and (4), but was incapable of exact information recording in the recessed portion of the recording medium (1) and was incapable of reproducing the information correctly recorded in the recessed portion of the recording medium (1) with the probe 31 of the fourth embodiment.

Figure 14:
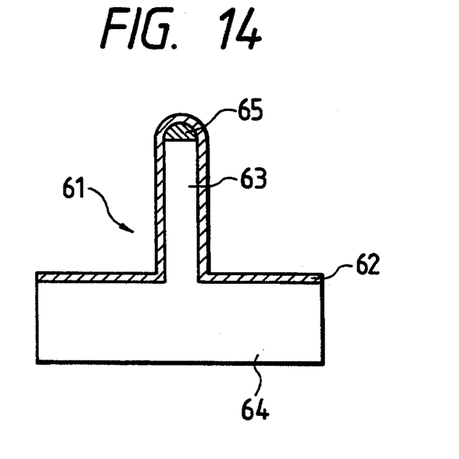
FIG. 14 is a cross-sectional view showing still another embodiment of the probe to be incorporated in the record/reproducing apparatus of the present invention.

The probe 51 of the present embodiment could be regenerated successfully as in the fourth embodiment.
[Embodiment 6] In the following there will be explained a sixth embodiment of the present invention, with reference to FIG. 14 showing a probe 61.

The probe 61 of the present embodiment is composed of a Si substrate 64 and a microprobe electrode 63 consisting of a whisker having an Au—Si alloy portion 65 at the end. The surface of the Si substrate 64 and of the microprobe electrode 63 is given electroconductivity by an Au—Pd layer 62. In this embodiment, for growing the whisker constituting the microprobe electrode 63, there is utilized a whisker growing method called VLS method (R. S. Wagner and W. C. Ellis; Applied Physics Letters 4 (1986) 89).

The principle of the VLS method is to make a liquid droplet of fused Au—Si alloy on a Si substrate and to place them in $SiCl_4$ atmosphere, whereby Si in gaseous phase is dissolved in the Au—Si liquid droplet to create a supersaturated state and Si is crystallized under said liquid droplet, thus causing whisker growth lifting the liquid droplet.

Figure 15:
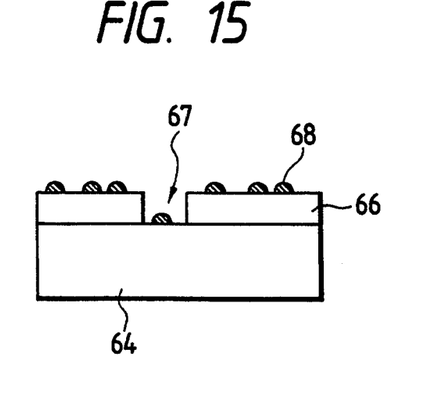
FIG. 15 is a schematic view showing the method for producing the probe shown in FIG. 14.

The probe preparation utilizing said VLS method will be explained in the following, with reference to FIG. 15.

A monocrystalline silicon substrate 64 was used as the supporting member and was coated, on the (111) plane thereof, with a resist material to form a resist layer 66. Then holes 67 of about 1 $\mu$m $\phi$ were formed, with a pitch of 5 mm, in said resist layer 66 by means of an electron beam and a very small amount of Au was deposited by evaporation from above. Subsequently the resist layer 66 was stripped off from the Si substrate 64. The amount of deposited Au was measured as 0.2 nm when measured with a film thickness gauge utilizing a quartz crystal oscillator. However the evaporated Au did not form a uniform film of such thickness, but in fact formed particles 68 of an average diameter of 20 nm, and each hole 67 of the resist layer 66 contained one to several particles.

Then the Si substrate was cut into squares of 5×5 mm each, and a Si substrate 64 containing only one Au particle 68 of about 10 nm in diameter was selected by the observation under a scanning electron microscope of a high resolving power. Said Si substrate 64 was heated to 1000° C. in an oven to fuse the Au particle 68, and $SiCl_4$—$H_2$ gaseous mixture was introduced at about 400° C. Thus, after 3 days, there was grown a whisker of an average thickness of about 10 nm, having the aforementioned Au—Si alloy portion 65 at the end. Finally the surface of the Si substrate 64 having said grown whisker was given electroconductivity by forming an Au—Pd layer 62 of as thickness of 5 nm by sputtering. The probe 61 was thus completed.

In the present embodiment, a non-conductive whisker was coated with Au—Pd by sputtering for obtaining electroconductivity, but Au or Pt may also be employed for the same purpose, and the method of coating is not limited to sputtering but can be plating or evaporation.

The probe 61 prepared as explained above was employed as the probe of the record/reproducing apparatus shown in FIG. 9, in the same manner as in the fourth embodiment, and recording and reproduction were conducted on four recording media with surface shapes (1)-(4) in the same manner as in the fourth embodiment.

As the result, the record/reproducing apparatus employing the probe 61 of the present embodiment was capable of correct information recording in the recessed portion of the recording media (2), (3) and (4), and of correct information reproduction from the information recording in said recessed portion, but was incapable of correct information recording in the recessed portion of the medium (1) and of reproduction of the information correctly recorded in said recessed portion by the probe 1 of the fourth embodiment.

[Reference Example]

For the purpose of comparison with the embodiments 4, 5 and 6, a tungsten wire of 1 mm $\phi$ was formed as shown in FIG. 3 by electrolytic polishing, incorporated as the probe 31 of the record/reproducing apparatus shown in FIG. 9, and was subjected to the evaluation of recording and reproduction on the recording media (1)-(4) in the same manner as in the fourth embodiment.

As the result, the record/reproducing apparatus employing the probe electrode of the present reference example was capable of exact information recording in the recessed portion, and of exact reproduction of information therefrom, on the recording medium (4), but was incapable of exact information recording in the recessed portion and of reproduction of the information correctly recorded in said recessed portion with the apparatus of the fourth embodiment, in case of the recording media (1), (2) and (3).

The results of recording and reproduction in the foregoing embodiments 4, 5 and 6, and in the reference example are summarized in Table 1.

TABLE 1

| Recording medium | (1) | (2) | (3) | (4) |
|---|---|---|---|---|
| Embodiment 4 | + | + | + | + |
| Embodiment 5 | − | + | + | + |
| Embodiment 6 | − | + | + | + |
| Reference Example | − | − | − | + | wherein:
"+": case where exact recording and reproduction were possible;
"−": case where exact recording or reproduction was not possible;
(1) width of recess = 10 nm;
depth of recess = 10 nm;
width of protrusion = 10 nm;
(2) width of recess = 20 nm;
depth of recess = 10 nm;
width of protrusion = 10 nm;
(3) width of recess = 50 nm;
depth of recess = 20 nm;
width of protrusion = 20 nm;
(4) width of recess = 100 nm;
depth of recess = 30 nm;
width of protrusion = 50 nm.

As explained in the foregoing 4th to 6th embodiments, the end of the probe is continued by a probe shaft portion with a low variation rate in the cross sectional area, so that the cross section of the microprobe electrode remains substantially same within the height of surface irregularities of the recording medium. Consequently the microprobe electrode does not contact nor is positioned very close to the recording medium except in the end of said electrode, and exact information recording and reproduction are enabled even on a recording medium involving surface irregularities.

What is claimed is:

1. A probe for effecting, at a longitudinal end thereof, at least one of information reading from an object and information input to an object, comprising:

a supporting member; and a rod-shaped projection of which the end is positioned opposed to said object for at least one of information reading therefrom and information input thereto, wherein said rod-shaped projection protrudes from a partial area of said supporting member, said rod-shaped projection has a variation rate of the cross-sectional area not exceeding 10% continuously over a longitudinal length of at least 5 nm, and the maximum cross-sectional dimension or diameter in the end portion of said rod-shaped projection, positioned within the height of surface irregularities of said object, is within a range from 1 nm to 1 μm.

2. A probe according to claim 1, wherein said rod-shaped projection at least includes a part composed of a single crystal whisker.

3. An apparatus for at least one of information reading from an object and information input to an object, comprising:

a signal processing unit for signal processing for at least one of information reading from said object and information input to said object; and a probe positioned opposed to said object, wherein said signal processing unit is adapted to effect at least one of information reading from said object and information input to said object through a longitudinal end of said probe, said probe includes a supporting member and a rod-shaped projection of which the end is positioned opposed to said object for at least one of information reading therefrom and information input thereto, said rod-shaped projection protrudes from a partial area of said support member, said rod-shaped projection has a variation rate of the cross sectional area not exceeding 10% continuously over a longitudinal length of at least 5 nm and the maximum cross-sectional dimension or diameter in the end portion of said rod-shaped projection, positioned within the height of surface irregularities of said object, is within a range from 1 nm to 1 μm.

4. An apparatus according to claim 3, wherein said signal processing unit is adapted to measure the surface information of the object based on the information read through said probe.

5. An apparatus according to claim 3, wherein said signal processing unit is adapted to effect at least one of information recording to and information reproduction from an information recording medium, serving as said object, through said probe.

6. An apparatus according to claim 5, wherein said signal processing unit is adapted to effect information recording by applying a voltage between said probe and said information recording medium thereby inducing an electric memory effect therein.

7. An apparatus according to claim 6, wherein said probe is adapted to effect the recording while moving along a recessed groove formed on said information recording medium.

8. An apparatus according to claim 5, wherein said signal processing unit is adapted to effect information reproduction by applying a voltage between said probe and said information recording medium and detecting the current flowing therebetween.

9. An apparatus according to claim 8, wherein said probe is adapted to read data recorded in a recessed groove formed on said information recording medium.

10. An apparatus according to claim 3, wherein said rod-shaped projection at least includes a part composed of a monocrystalline whisker.

11. An apparatus according to claim 10, wherein said monocrystalline whisker is composed of a metal.

12. An apparatus according to claim 10, wherein said monocrystalline whisker is composed of a non-conductive material, and is coated with a conductive material.

13. A probe for effecting at least one of information reading from an object and information input to an object by applying a voltage between said probe and said object, comprising:

a supporting member; and a rod-shaped projection of which the end is positioned opposed to said object for at least one of information reading therefrom and information input thereto;

wherein said rod-shaped projection protrudes from a partial area of said supporting member, said rod-shaped projection has a variation rate of the cross sectional area not exceeding 10% continuously over a longitudinal length of at least 5 nm and the maximum cross-sectional dimension or diameter or diameter in the end portion of said rod-shaped projection, positioned within the height of surface irregularities of said object, is within a range from 1 nm to 1 μm.

14. A probe according to claim 13, wherein said rod-shaped projection at least includes a part composed of a monocrystalline whisker.

15. An apparatus for at least one of information reading from an object and information input into an object, comprising:

a signal processing unit for signal processing for at least one of information reading from said object and information input to said object; and a probe positioned opposed to said object;

wherein said signal processing unit is adapted to effect the at least one of information reading from said object and information input to said object by applying a voltage between said probe and said object, said probe includes a supporting member and a rod-shaped projection of which the end is positioned opposed to said object for at least one of information reading from and information input thereto, said rod-shaped projection protrudes from a partial area of said supporting member, said rod-shaped projection has a variation rate of the cross sectional area not exceeding 10% continuously over a longer length of at least 5 nm and the maximum cross-sectional dimension or diameter in the end portion of said rod-shaped projection, positioned within the height of surface irregularities of said object, is within a range from 1 nm to 1 μm.

16. An apparatus according to claim 15, wherein said signal processing unit is adapted to measure surface information of the object based on the information read through said probe.

17. An apparatus according to claim 15, wherein said signal processing unit is adapted to effect at least one of information recording to and information reproduction from an information recording medium, serving as said object, through said probe.

18. An apparatus according to claim 17, wherein said signal processing unit is adapted to effect information recording by applying a voltage between said probe and said information recording medium thereby inducing an electric memory effect therein.

19. An apparatus according to claim 18, wherein said probe is adapted to effect the recording while moving along a recessed groove formed on said information recording medium.

20. An apparatus according to claim 17, wherein said signal processing unit is adapted to effect information reproduction by applying a voltage between said probe and said information recording medium and detecting the current flowing therebetween.

21. An apparatus according to claim 20, wherein said probe is adapted to read data recorded in a recessed groove formed on said information recording medium.

22. An apparatus according to claim 15, wherein said rod-shaped projection at least includes a part composed of a monocrystalline whisker.

23. An apparatus according to claim 22, wherein said monocrystalline whisker is composed of a metal.

24. An apparatus according to claim 22, wherein said monocrystalline whisker is composed of a non-conductive material, and is coated with a conductive material.

25. A probe positioned close to an object for at least one of information reading therefrom and information input thereto, comprising:
a supporting member; and
a rod-shaped projection of which the end is positioned opposed to said object for at least one of information reading therefrom and/or information input thereto,
wherein said rod-shaped projection protrudes from a partial area of said supporting member, said rod-shaped projection has a variation rate of the cross sectional area not exceeding 10% continuously over a longitudinal length of at least 5 nm and the maximum cross-sectional dimension or diameter in the end portion of said rod-shaped projection positioned within the height of surface irregularities of said object, is within a range from 1 nm to 1 $\mu$m.

26. A probe according to claim 25, wherein said rod-shaped projection at least includes a part composed of a monocrystalline whisker.

27. An apparatus for at least one of information reading from an object and information input into an object, comprising:
a signal processing unit for signal processing for at least one of information reading from said object and information input to said object; and
a probe positioned opposed to said object;
wherein said signal processing unit is adapted to effect at least one of information reading from said object and information input to said object through said probe in a state thereof positioned close to said object, said probe includes a supporting member and a rod-shaped projection of which the end is positioned opposed to said object for at least one of information reading therefrom and information input thereto, said rod-shaped projection protrudes from a partial area of said supporting member, said rod-shaped projection has a variation rate of the cross sectional area not exceeding 10% continuously over a longitudinal length of at least 5 nm and the maximum cross-sectional dimension or diameter in the end portion of said rod-shaped projection, positioned within the height of surface irregularities of said object is within a range from 1 um to 1 $\mu$m.

28. An apparatus according to claim 27, wherein said signal processing unit is adapted to measure surface information of the object based on the information read through said probe.

29. An apparatus according to claim 27, wherein said signal processing unit is adapted to effect at least one of information reading to and information reproduction from an information recording medium, serving as said object, through said probe.

30. An apparatus according to claim 29, wherein said signal processing unit is adapted to effect information recording by applying a voltage between said probe and said information recording medium thereby including an electric memory effect therein.

31. An apparatus according to claim 30, wherein said probe is adapted to effect the recording while moving along a recessed groove formed on said information recording medium.

32. An apparatus according to claim 29, wherein said signal processing unit is adapted to effect information reproduction by applying a voltage between said probe and said information recording medium and detecting the current flowing therebetween.

33. An apparatus according to claim 32, wherein said probe is adapted to read data recorded in a recessed groove formed on said information recording medium.

34. An apparatus according to claim 27, wherein said rod-shaped projection at least includes a part composed of a monocrystalline whisker.

35. An apparatus according to claim 34, wherein said monocrystalline whisker is composed of a metal.

36. An apparatus according to claim 34, wherein said monocrystalline whisker is composed of a non-conductive material, and is coated with a conductive material.

37. A probe for effecting, at a longitudinal end thereof, at least one of information reading from an object and information input to an object, comprising:
a supporting member; and
a rod-shaped projection of which the end is positioned opposed to said object for at least one of information reading therefrom and information input thereto,
wherein said rod-shaped projection protrudes from a partial area of said supporting member, and
wherein said rod-shaped projection at least includes a part composed of a single crystal whisker.

38. An apparatus for at least one of information reading from an object and information input to an object, comprising:
a signal processing unit for signal processing for at least one of information reading from said object and information input to said object; and
a probe positioned opposed to said object,
wherein said signal processing unit is adapted to effect at least one of information reading from said object and information input to said object through a longitudinal end of said probe, said probe includes a supporting member, and a rod-shaped projection of which the end is positioned opposed to said object for at least one of information reading therefrom and information input thereto, said rod-shaped projection protrudes from a partial area of said support member and said rod-shaped projection at least includes a part composed of a monocrystalline whisker.

39. An apparatus according to claim 38, wherein said signal processing unit is adapted to measure the surface information of the object based on the information read through said probe.

40. An apparatus according to claim 38, wherein said signal processing unit is adapted to effect at least one of information recording to and information reproduction from an information recording medium, serving as said object, through said probe.

41. An apparatus according to claim 40, wherein said signal processing unit is adapted to effect information recording by applying a voltage between said probe and said information recording medium thereby inducing an electric memory effect therein.

42. An apparatus according to claim 41, wherein said probe is adapted to effect the recording while moving along a recessed groove formed on said information recording medium.

43. An apparatus according to claim 40, wherein said signal processing unit is adapted to effect information reproduction by applying a voltage between said probe and said information recording medium and detecting the current flowing therebetween.

44. An apparatus according to claim 43, wherein said probe is adapted to read data recorded in a recessed groove formed on said information recording medium.

45. An apparatus according to claim 38, wherein said monocrystalline whisker is composed of a metal.

46. An apparatus according to claim 38, wherein said monocrystalline whisker is composed of a non-conductive material, and is coated with a conductive material.

47. A probe for effecting at least one of information reading from an object and information input to an object by applying a voltage between said probe and said object, comprising:
   a supporting member; and
   a rod-shaped projection of which an end is positioned opposed to said object for at least one of information reading therefrom and information input thereto,
   wherein said rod-shaped projection protrudes from a partial area of said supporting member and said rod-shape projection at least includes a part composed of a monocrystalline whisker.

48. An apparatus for at least one of information reading from an object and information input into an object, comprising:
   a signal processing unit for signal processing for at least one of information reading from said object and information input to said object; and
   a probe positioned opposed to said object;
   wherein said signal processing unit is adapted to effect the at least one of information reading from said object and information input to said object by applying a voltage between said probe and said object, said probe includes a supporting member and a rod-shaped projection of which the end is positioned opposed to said object for at least one of information reading therefrom and information input thereto, said rod-shaped projection protrudes from a partial area of said supporting member, and said rod-shaped projection at least includes a part composed of a monocrystalline whisker.

49. An apparatus according to claim 48, wherein said signal processing unit is adapted to measure surface information of the object based on the information read through said probe.

50. An apparatus according to claim 48, wherein said signal processing unit is adapted to effect at least one of information recording to and information reproduction from an information recording medium, serving as said object, through said probe.

51. An apparatus according to claim 50, wherein said signal processing unit is adapted to effect information recording by applying a voltage between said probe and said information recording medium thereby inducing an electric memory effect therein.

52. An apparatus according to claim 51, wherein said probe is adapted to effect the recording while moving along a recessed groove formed on said information recording medium.

53. An apparatus according to claim 50, wherein said signal processing unit is adapted to effect information reproduction by applying a voltage between said probe and said information recording medium and detecting the current flowing therebetween.

54. An apparatus according to claim 53, wherein said probe is adapted to read data recorded in a recessed groove formed on said information recording medium.

55. An apparatus according to claim 48, wherein said monocrystalline whisker is composed of a metal.

56. An apparatus according to claim 48, wherein said monocrystalline whisker is composed of a non-conductive material, and is coated with a conductive material.

57. A probe positioned close to an object for at least one of information reading therefrom and information input thereto, comprising:
   a supporting member; and
   a rod-shaped projection of which an end is positioned opposed to said object for at least one of information reading therefrom and information inputting thereto,
   wherein said rod-shaped projection protrudes from a partial area of said supporting member and said rod-shaped projection at least includes a part composed of a monocrystalline whisker.

58. An apparatus for at least one of information reading from an object and information input into an object, comprising:
   a signal processing unit for signal processing for at least one of information reading from said object and information input to said object; and
   a probe positioned opposed to said object;
   wherein said signal processing unit is adapted to effect at least one of information reading from said object and information input to said object through said probe in a state thereof positioned close to said object, said probe includes a supporting member and a rod-shaped projection of which the end is positioned opposed to said object for at least one of information reading therefrom and information input thereto, said rod-shaped projection protrudes from a partial area of said supporting member, and said rod-shaped projection at least includes a part composed of a monocrystalline whisker.

59. An apparatus according to claim 58, wherein said signal processing unit is adapted to measure surface information of the object based on the information read through said probe.

60. An apparatus according to claim 58, wherein said signal processing unit is adapted to effect at least one of information reading to and information reproduction from an information recording medium, serving as said object, through said probe.

61. An apparatus according to claim 60, wherein said signal processing unit is adapted to effect information recording by applying a voltage between said probe and said information recording medium thereby including an electric memory effect therein.

62. An apparatus according to claim 61, wherein said probe is adapted to effect the recording while moving along a recessed groove formed on said information recording medium.

63. An apparatus according to claim 60, wherein said signal processing unit is adapted to effect the information reproduction by applying a voltage between said probe and said information recording medium and detecting the current flowing therebetween.

64. An apparatus according to claim 63, wherein said probe is adapted to read data recorded in a recessed groove formed on said information recording medium.

65. An apparatus according to claim 58, wherein said monocrystalline whisker is composed of a metal.

66. An apparatus according to claim 58, wherein said monocrystalline whisker is composed of a non-conductive material, and is coated with a conductive material.

* * * * *

UNITED STATES PATENT AND TRADEMARK OFFICE
CERTIFICATE OF CORRECTION

PATENT NO. : 5,390,161
DATED : February 14, 1995
INVENTOR(S) : SUOMI KURIHARA, ET AL.

Page 1 of 2

It is certified that error appears in the above-identified patent and that said Letters Patent is hereby corrected as shown below:

COLUMN 1

Line 61, "relative" should read --relatively--.
    Line 63, "probe 1'" should read --probe 1--.
    Line 64, "2'" should read --2--.

COLUMN 3

Line 37, "with" should read --will--.
    Line 47, "recesses" should read --recess--.

COLUMN 4

Line 42, "are" should read --is--.

COLUMN 5

Line 21, "of" should be deleted.

COLUMN 6

Line 43, "grating 3'" should read --grating 3--.
    Line 58, "amplifiers" should read --amplifies--.

COLUMN 7

Line 63, "o" should read --of--.

COLUMN 11

Line 17, "which" should read --of--.
    Line 30, "utilizes" should read --utilized--.
    Line 33, "of" should be deleted.

UNITED STATES PATENT AND TRADEMARK OFFICE
CERTIFICATE OF CORRECTION

PATENT NO. : 5,390,161
DATED : February 14, 1995
INVENTOR(S) : SUOMI KURIHARA, ET AL.

It is certified that error appears in the above-identified patent and that said Letters Patent is hereby corrected as shown below:

COLUMN 12

Line 32, "extent" should read --extend--.

COLUMN 13

Line 6, "In the" should read --¶ In the--.

COLUMN 15

Line 38, "cross sectional" should read --cross-sectional--.

COLUMN 16

Line 23, "cross" should read --cross- --.

COLUMN 17

Line 34, "cross" should read --cross- --.
Line 67, "1 um" should read --1 nm--.

Signed and Sealed this

Thirteenth Day of June, 1995

Attest:

BRUCE LEHMAN

Attesting Officer     Commissioner of Patents and Trademarks